United States Patent
Nogami

(10) Patent No.: US 7,619,828 B2
(45) Date of Patent: Nov. 17, 2009

(54) PROJECTION LENS UNIT HAVING REFLECTION MIRROR IN PROJECTION LENS SYSTEM AND METHOD OF AND EQUIPMENT FOR FIXING REFLECTION MIRROR

(75) Inventor: Atsushi Nogami, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 147 days.

(21) Appl. No.: 12/071,319

(22) Filed: Feb. 20, 2008

(65) Prior Publication Data

US 2008/0291552 A1 Nov. 27, 2008

(30) Foreign Application Priority Data

Feb. 20, 2007 (JP) ............... 2007-039635

(51) Int. Cl.
*G02B 9/00* (2006.01)
*G02B 17/00* (2006.01)
*G02B 7/00* (2006.01)

(52) U.S. Cl. ............... 359/649; 359/733; 359/811
(58) Field of Classification Search ......... 359/649–651, 359/733–736
See application file for complete search history.

(56) References Cited

U.S. PATENT DOCUMENTS

| | | | | |
|---|---|---|---|---|
| 3,709,582 A | * | 1/1973 | Walker ............... | 359/733 |
| 5,774,271 A | * | 6/1998 | Lagerway et al. ........... | 359/649 |
| 7,242,530 B2 | * | 7/2007 | Yeo ............................. | 359/682 |
| 7,443,617 B2 | * | 10/2008 | Tsai ............................ | 359/811 |
| 2007/0268593 A1 | * | 11/2007 | Kang et al. ................. | 359/649 |

FOREIGN PATENT DOCUMENTS

JP 2005-352293 12/2005

* cited by examiner

*Primary Examiner*—Jordan M. Schwartz
(74) *Attorney, Agent, or Firm*—Young & Thompson

(57) ABSTRACT

A frame 18 with a first lens group 15 and a second lens group 17 of a projection lens system fixedly mounted thereto is supported by a support arm 43 so as to direct a mirror mounting aperture 27 of the frame 18 downward. The reflection mirror 16 for folding an optical axis of the projection lens system is held and placed within the mirror mounting aperture 27 of the frame 18 by a mirror support 46 so as thereby to provisionally complete the projection lens system. Then, while an image of a test pattern generated by a test pattern projection head 44 is projected onto a remote screen 47 by the provisionally complete the projection lens system, the reflection mirror 16 is adjusted in position by 45 by a mirror position adjusting unit 45. When the test pattern image on the screen is correctly projected, a bonding adhesive is filled in a circumferential clearance left between the reflection mirror 16 and the mirror mounting aperture 27 and cured by use of an ultraviolet lamp 49 to bond and fix the reflection mirror 16 to the frame 18.

12 Claims, 6 Drawing Sheets

PROJECTION LENS UNIT HAVING REFLECTION MIRROR IN PROJECTION LENS SYSTEM AND METHOD OF AND EQUIPMENT FOR FIXING REFLECTION MIRROR

BACKGROUND OF THE INVENTION

1. Field of the Invention

The present invention relates to a projection lens unit for use in a rear projection device and, more specifically, to a projection lens unit which comprises a projection lens system having a reflection mirror for folding back an optical axis of the projection lens system and a frame fixedly holding the projection lens system, and a method of and apparatus for fixing the reflection mirror to the frame of the projection lens unit.

2. Description of Related Art

Rear projection devices have come into widespread as large-sized screen monitors. Such a rear projection device comprises a front monitor screen, a rear reflection mirror disposed behind the front monitor screen and an optical engine for forming an optical image which is projected onto the rear reflection mirror and then onto the front monitor screen from behind. All of the components of the projection device are incorporated within a housing. The optical engine comprises an illumination optical system for uniformizing an illumination light ray from a high intensity light source, a color separating/recombining optical device for separating the illumination light ray into three primary light rays for formation of primary color images of an image generated by an image generator and recombining the primary color images into a single color image and a projection lens system for magnifying the color image and projecting it onto the rear reflection mirror. Specifically, the projection lens unit comprises a frame and a projection lens system mounted in the frame as one integral unit. The projection lens system comprises a first or converging lens group for converging image information carrying light rays incident thereupon from the color separating/recombining optical device, a second or diverging lens group disposed coaxially with the first lens group for diverging the image information carrying light rays and projecting them as an magnified color image onto a rear reflection mirror and a reflection mirror disposed between the first and the second lens group for folding back an optical axis of the projection lens system. As described in Japanese Unexamined Patent Publication No. 2005-352293, the conventional projection lens unit is fixedly installed in the housing with the mirror abutted and bonded at its periphery on, or otherwise fixed to, a mirror holder of the frame.

The positional accuracy of the reflection mirror of the projection lens unit significantly impinges on a performance of the rear projection device. For example, if the reflection mirror is fixed with a low degree of positional accuracy, an image projected on the monitor screen is off centered or accompanied by a trapezoidal distortion. This results in deterioration in image quality. In order to maintain image quality on the monitor screen, it is essential to perform production of frames of the projection lens unit having precise mirror holders under highly controlled accuracy which demands much man power and high production costs.

SUMMARY OF THE INVENTION

It is therefore an object of the present invention to provide a projection lens unit which eliminates precise work of forming a mirror holder of the unit and, however, enables to fix a reflection mirror of a projection lens system to the mirror holder with a high degree of accuracy.

It is another object of the present invention to provide a method of and an equipment for fixing a reflection mirror of a projection lens system to a mirror holder of a projection lens unit which has no need of precise work of forming the mirror holder.

The foregoing objects of the present invention is accomplished by a projection lens unit for use in a rear projection device having a monitor screen onto which a subject image is projected from behind by a projection lens system comprising a first lens group disposed at an incident side, a second lens group disposed optically coaxially with the first lens group at an exit side, a reflection mirror disposed between the first and the second lens group for folding an optical axis of the projection lens system, and a frame for fixedly holding the projection lens system. The frame has a mounting aperture greater in dimension than the reflection mirror so as to receive the reflection mirror therein with a circumferential clearance left between the reflection mirror and the mounting aperture which is filled with a bonding adhesive, desirably containing a particulate filler or a powdered filler and/or being of an ultraviolet cure type, from the outside of the frame so as thereby to fix the reflection mirror to the frame. The mounting aperture has an inner dimension large enough to allow position adjustment of the reflection mirror therein and to be filled with the bonding adhesive.

According to another aspect of the present invention, the method of fixing the reflection mirror to the frame of the projection lens unit comprises the steps of fixedly holding the first and the second lens group in the frame, placing the reflection mirror within the mounting aperture of the frame which is large in dimension enough to provide a circumferential clearance between an inner periphery of the mounting aperture and an outer periphery of the reflection mirror placed within the mounting aperture for receiving the bonding adhesive from the outside of the frame, projecting a test pattern onto a screen remote from the projection lens unit through the projection lens unit with the reflection mirror placed within the mounting aperture of the frame, adjusting the reflection mirror in position in the mounting aperture of the frame according an image of the test pattern projected on the screen, and bonding and fixing the reflection mirror to the frame with a bonding adhesive after completion of position adjustment of the reflection mirror. The bonding adhesive desirably comprises an ultraviolet cure bonding adhesive.

According to a further aspect of the present invention, the mirror fixing equipment for fixing the reflection mirror to the frame of the projection lens unit comprises support means for supporting the frame with the first and the second lens group fixed thereto, mirror holding means such as of a pneumatic suction type for holding and placing the reflection mirror within the mounting aperture of the frame from the outside of the frame keeping a circumferential clearance between an outer periphery of the reflection mirror and an inner periphery of the mounting aperture, image forming means for forming a test pattern image, a screen onto which the test pattern image is projected by the projection lens system with the reflection mirror held in the mounting aperture of the frame by the mirror holding means, position adjusting means for adjusting a position of the reflection mirror held within the mounting aperture of the frame according to the test pattern image projected onto the screen, and fixing means for fixing the reflection mirror to the frame with a bonding adhesive.

The fixing means may comprise adhesive filling means for filling the circumferential clearance with a bonding adhesive and curing means for curing the bonding adhesive in the circumferential clearance. Further, when using an ultraviolet cure type of bonding adhesive, the curing means preferably comprises an ultraviolet lamp.

BRIEF DESCRIPTION OF THE DRAWINGS

The foregoing and other objects and features of the present invention will be clearly understood from the following detailed description when reading with reference to the accompanying drawings in which same or similar parts or portions are denoted by the same reference numerals, and wherein.

DETAILED DESCRIPTION OF THE PREFERRED EMBODIMENTS

Figure 1:
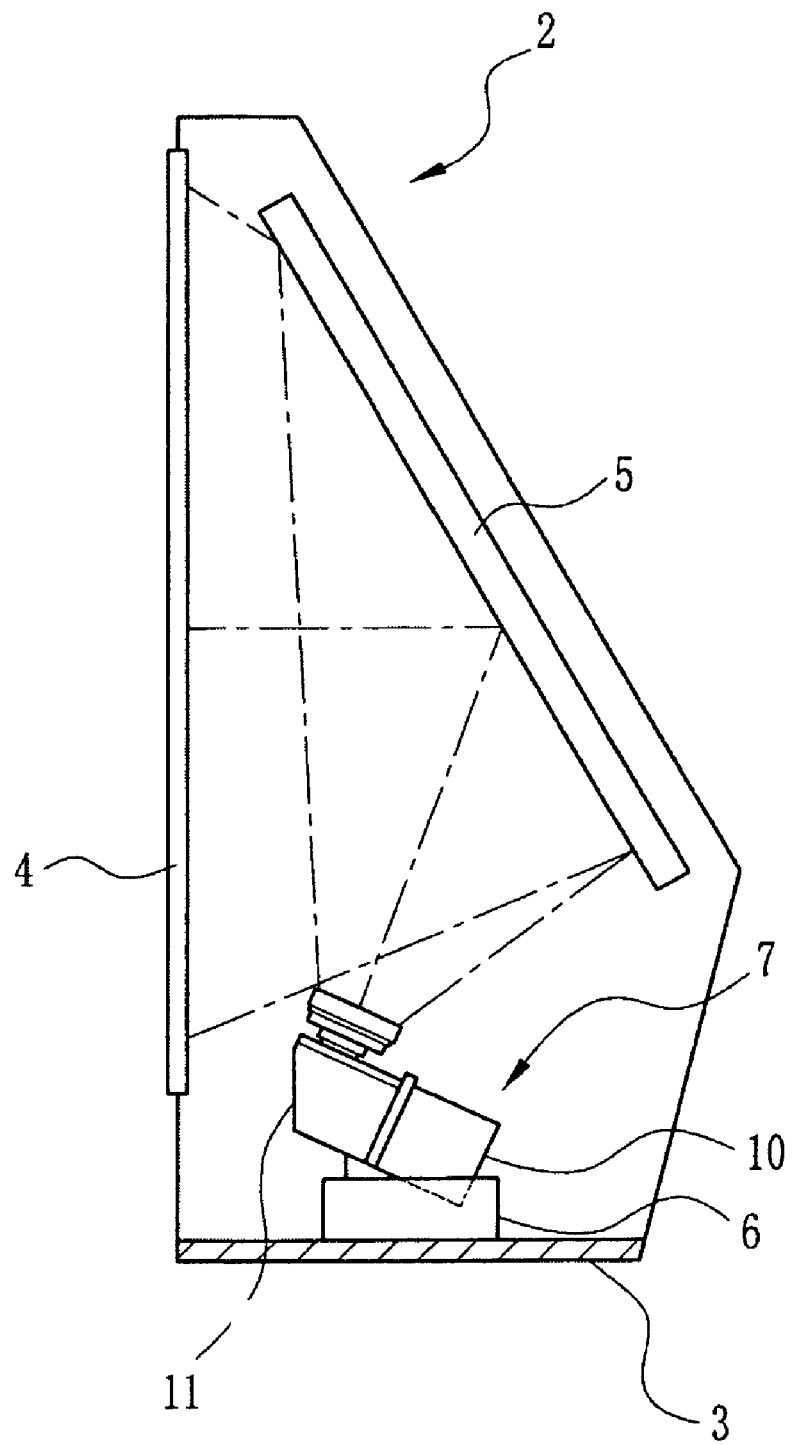
FIG. 1 is a structural view of a rear projection device according to an embodiment of the present invention.

Referring to the accompanying drawings in detail and, in particular, to FIG. 1 showing a rear projection device 2 including a projection lens unit 11 according to an embodiment of the present invention, the rear projection device 2 comprises a housing 3 with a monitor screen 4 provided at the front, a rear reflection mirror 5 disposed behind and at a slight angle with the monitor screen 4 and an optical engine 7 fixed to a mount 6 at the bottom of the housing 3. The rear reflection mirror 5 and the optical engine 7 are arranged in such positions as fold backward a projection light path between the monitor screen 4 and the optical engine 7 so as thereby to decrease an overall depth of the rear projection device 2.

The optical engine 7 comprises an image generator unit 10 and a projection lens unit 11 for projecting an image generated by the image generator unit 10. The image generator unit 10 comprises a light source, an illumination optical system and a color separating/recombining optical system which are not specifically shown and, however, known in various form in the art. More specifically, the light source may be selected from among high intensity lamps such as a metal halide lamp, an ultra-high pressure mercury lamp, a xenon lamp, etc. according to an intended purpose of the rear projection device 2. The illumination optical system, which provides uniform illumination light rays, may comprise a fly-array lens, a polarization scrambler element and a condenser lens. The color separating/recombining optical system, which separates uniform illumination light rays into three primary color light rays, namely red, blue and green light rays, forming respective color images and recombining the primary color images into a single color image, may comprise a dichroic mirror, a polarization prism, a dichroic prism, a combining prism and an LCD panel.

Figure 2:
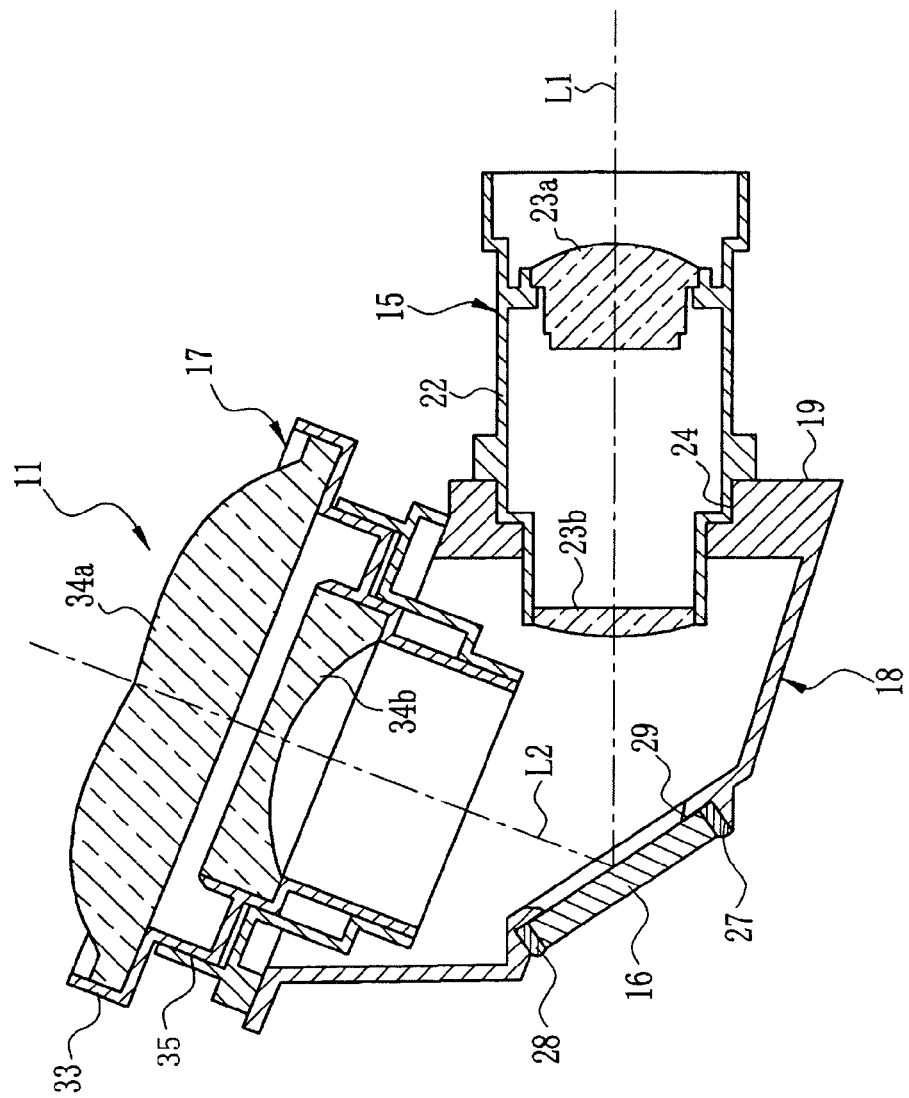
FIG. 2 is a sectional view of a projection lens unit installed in the rear projection device shown in FIG. 1.

Referring to FIG. 2 showing in detail, the projection lens unit 11 comprises a frame 18 and a projection lens system comprising a first lens group 15 having a converging lens function, a reflection mirror 16 and a second lens group 17 having a magnifying lens function fixedly mounted to the frame 18. The frame 18, which is preferably made of a light blocking plastic or a metal, mounts the reflection lens system in such a formation as folds back an optical axis of the projection lens system. The frame 18 has a flange 19 surrounding a lens barrel mounting aperture 24 for holding the first lens group 15 through which the projection lens unit 11 is connected to the image generator unit 10. The first lens group 15, which converges incoming primary light rays from the image generator unit 10 on an optical axis L1 thereof, comprises two lens elements 23a and 23b fixedly held by a lens barrel 22 fitted in the lens barrel mounting aperture 24 of the frame 18. The second lens group 17, which has an optical axis L2 and projects a magnified color image onto the rear reflection mirror 5, comprises two lens elements 34a and 34b fixedly held by a lens barrel 33 movably mounted in a lens barrel mounting aperture 35 of the frame 18. The frame 18 has a mirror mounting aperture 27 in which the reflection mirror 16 is mounted and to which the reflection mirror 16 is bonded by a bonding adhesive 28 filled in a circumferential clearance left between an inner periphery of the mounting aperture 27 and an outer periphery of the reflection mirror 16 placed within the mounting aperture 27 as shown in detail in FIG. 3 so as to fold back the optical axis (L1+L2) of the optical lens system diagonally upward to the rear. The mounting aperture 27 is provided with a flare prevention annular lip 29 operative to prevent marginal light rays from flaring through reflection by the reflection mirror 16.

Figure 3:
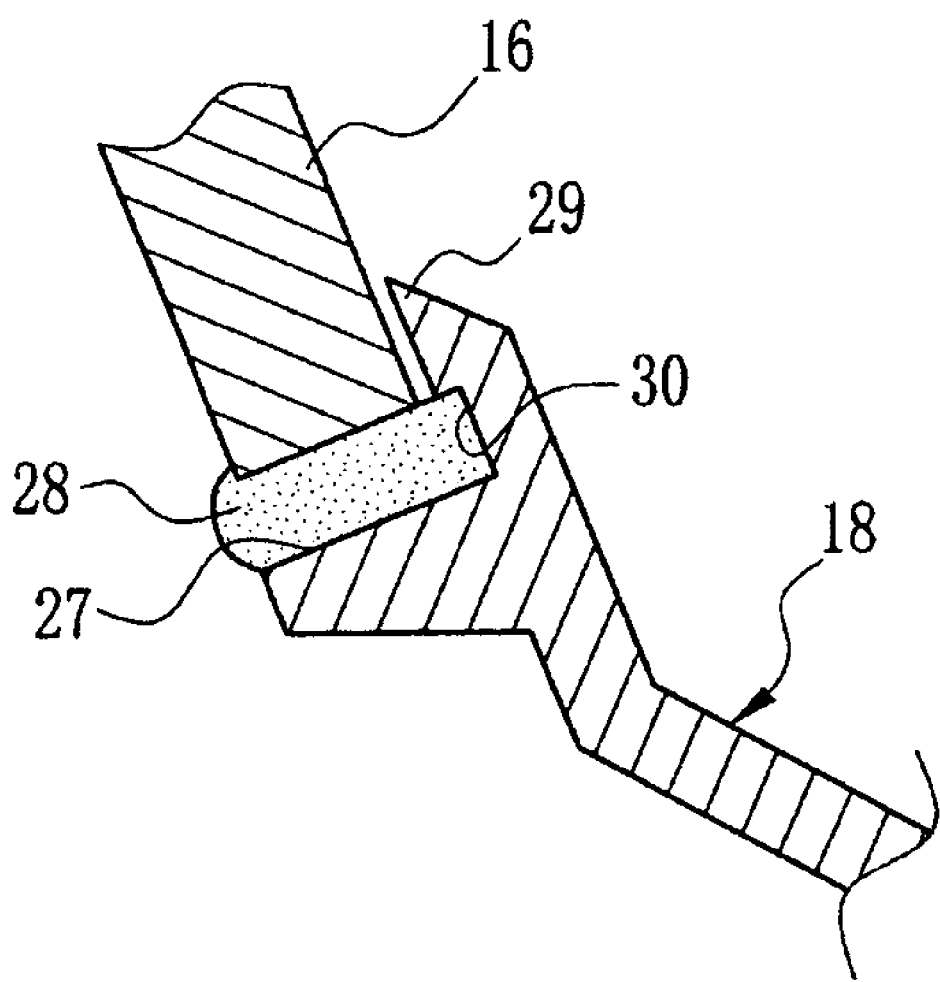
FIG. 3 is a sectional view a structure where a mirror is fixed.

Referring to FIG. 3, there is formed a retention groove 30 between the side wall of the mirror mounting aperture 27 and the flare prevention annular lip 29 which retains a bonding adhesive 28 therein, thereby preventing it from spilling into the interior of the frame 18. Further, the mirror mounting aperture 27 is large in dimension enough to allow the reflection mirror 16 to be moved therein for position adjustment.

Figure 4:
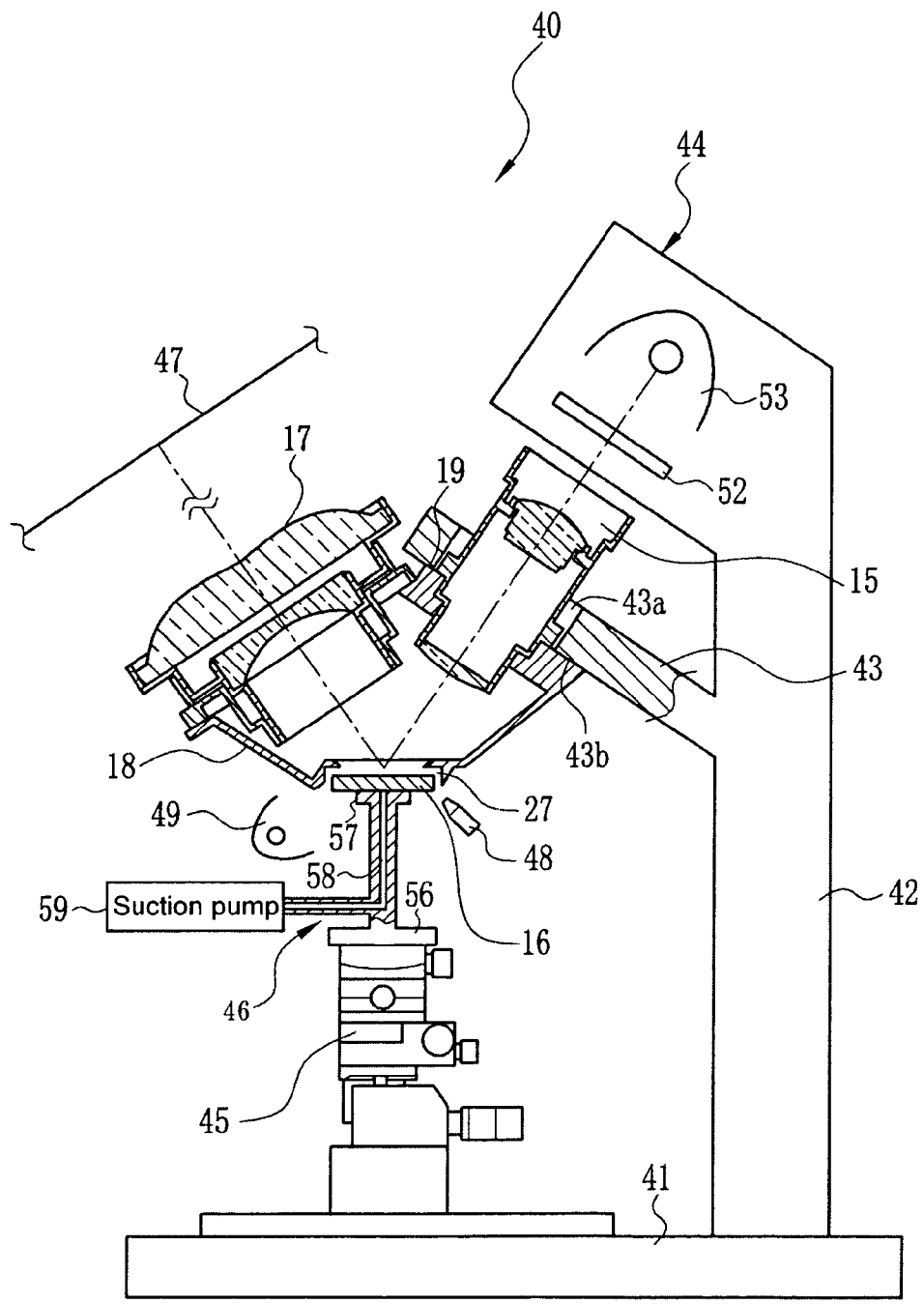
FIG. 4 is a structural view of a mirror fixing equipment.
Figure 5:
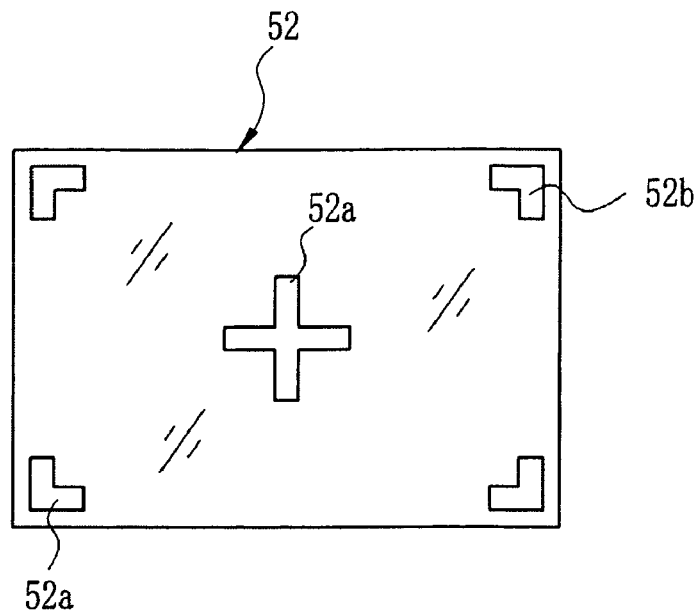
FIG. 5 is a plan view of a test pattern chart.

Referring to FIG. 4 showing a mirror fixing equipment 40 which is used to fix the reflection mirror 16 to the frame 18, the mirror fixing equipment 40 comprises a base 41, a column 42 extending upright from the base 41 which has a support arm 43 extending diagonally upward therefrom for supporting the frame 18 and a test pattern projection head 44 at the top thereof, a mirror position adjusting unit 45 set up on the base 41, and an adhesive filling unit 48. The mirror position adjusting unit 45 includes a mirror support 46 for supporting a reflection mirror 16 to be mounted to the frame 18. The mirror fixing equipment 40 accompanies a remote screen 47 and an ultraviolet lamp 49. The support arm 43 has a retention aperture 43a in which the lens barrel 22 of the first lens group 15 is retained and an attaching face 43b to which the flange 19 surrounding the lens barrel mounting aperture 24 of the frame 18 is attached. These retention aperture 43a and attaching face 43b are designed to support the frame 18 with the mirror mounting aperture 27 kept in a downward and horizontal direction. The test pattern projection head 44 includes a test pattern chart 52 disposed optically coaxially with the first lens group 15 and an illumination lamp 53 for illuminating the test pattern chart 52 formed on a transparent filter plate. As shown in FIG. 5, the test pattern chart 52 has a test pattern comprising a center crisscross symbol 52a and four corner hooked symbols 52b. An optical image of the test pattern is projected onto the remote screen 47 by the projection lens unit 11 supported by the support arm 43. The mirror position adjusting unit 45 comprises a compact precise positioning stage such as a micro stage, manually operated or power operated.

The mirror support 46 of the mirror position adjusting unit 45 comprises a pneumatic suction socket 57 fixedly attached to the mirror position adjusting unit 45 through a fixture 56, and a pneumatic suction pump 59 pneumatically connected to the pneumatic suction socket 57 through an air suction pipe 58. The mirror support 46 may comprise an electrostatic retaining socket, an adhesive retaining socket or any retaining means in place of the pneumatic suction socket 57.

The adhesive filling unit 48 takes the form of adhesive dispenser operative to fill a space between the side wall of the mirror mounting aperture 27 and the reflection mirror 16 positioned in the mirror mounting aperture 27 with a bonding adhesive 28 such as an ultraviolet cure adhesive which is cured under ultraviolet light from the ultraviolet lamp 49. In order to prevent the reflection mirror 16 from shifting in position due to cure shrinkage of the adhesive during a cure reaction, it is preferred to mix the bonding adhesive 28 with particles or powders of glass or metal so that the bonding adhesive 28 has a low degree of shrinkage.

Figure 6:
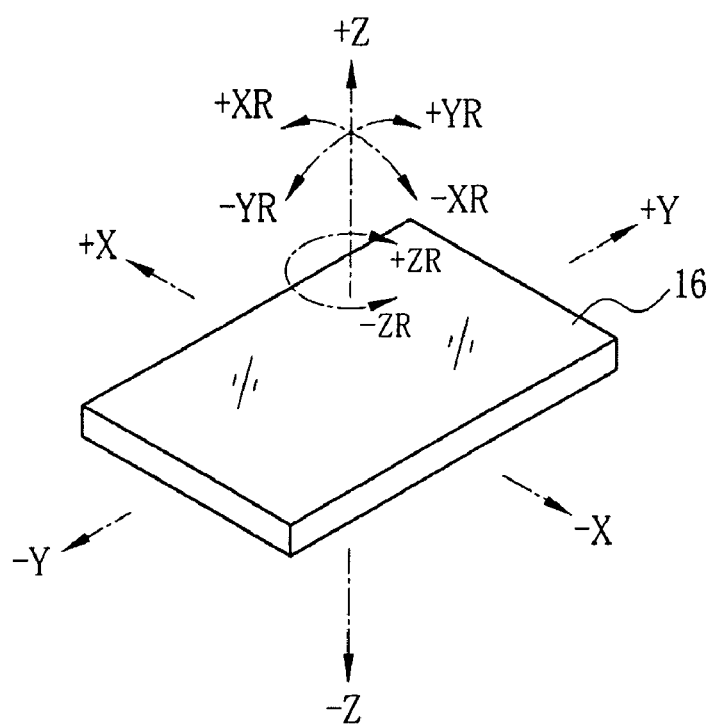
FIG. 6 is an explanatory view of mirror position adjustment.

FIG. 6 schematically shows directions of mirror position adjustment. As shown, the mirror position adjusting unit 45 is capable of moving the reflection mirror 16 supported on the mirror support 46 in opposite directions (+X and −X directions; +Y and −Y directions; +Z and −Z directions) independently in X, Y and Z directions and turning it in opposite directions (+XR and −XR directions; +YR and −YR directions; +ZR and −ZR directions) independently in X, Y and Z directions.

Figure 7:
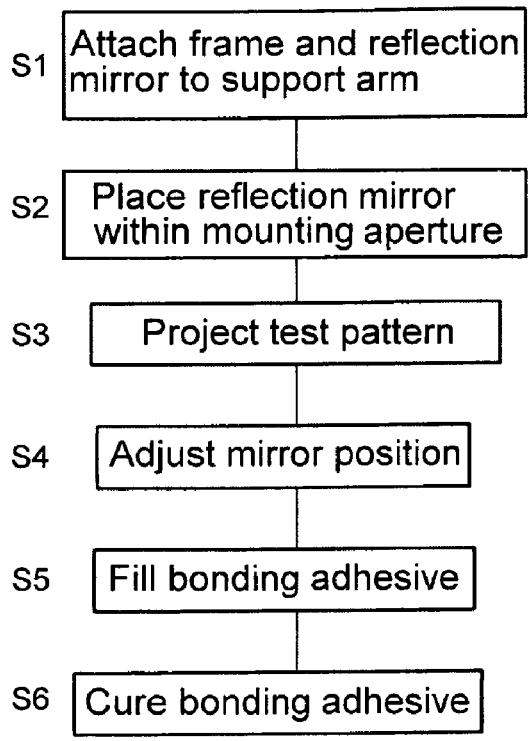
FIG. 7 is a flowchart illustrating a sequential operation of mirror fixation.

Referring to FIG. 7 illustrating mirror fixing sequential operation for fixing the reflection mirror 16 to the frame 18, first of all, at a preparatory stage S1, after preparing the frame 18 with all optical elements of the projection lens systems except a reflection mirror 16, i.e. the first lens group 15 and the second lens group 17, fixedly installed therein, the frame 18 is attached to the support arm 43 of the mirror fixing equipment 40. Thereafter, the reflection mirror 16 is put on the pneumatic suction socket 57 of the mirror support 46 in position as horizontal as possible and, subsequently, the pneumatic suction pump 59 is activated to suck air so that the pneumatic suction socket 57 fixedly holds the reflection mirror 16 thereon. At the subsequent stage S2, the mirror position adjusting unit 45 is operated to move the reflection mirror 16 upward until locating it in the mirror mounting aperture 27. At stage S3, the test pattern projection head 44 is activated to project an image of the test pattern of the test charge 52. Then, the test patter mage is projected onto the remote screen 47 by the projection lens unit 11 including the reflection mirror 16 on the pneumatic suction socket 57 of the mirror support 46. If the reflection mirror 16 is not positioned with respect to the optical axes L1 and L2 of the first lens group 15 and the second lens group 17 as designed, the test pattern image on the screen 47 is incorrectly positioned and has a deformation such as a trapezoidal distortion. Then, at stage S4, the mirror position adjusting unit 45 is operated to perform position adjustment of the reflection mirror 16 through movement and turn in X, Y and Z directions according to the position displacement and deformation of the test pattern image on the screen 47 as appropriate so that the test pattern image occupies a correct position on the screen 47 and dissolves the deformation. When the reflection mirror 16 is brought into a position as desired, the adhesive filling unit 48 is activated to dispense a bonding adhesive 28 so as to fill a space between the side wall of the mirror mounting aperture 27 and the reflection mirror 16 with the bonding adhesive 28 at stage S5. Immediately thereafter, at stage S6, the ultraviolet lamp 48 is switched on to expose the bonding adhesive 28 to ultraviolet light rays for cur reaction. When the bonding adhesive 28 has completely cured, the pneumatic suction pump 59 is deactivated and releases vacuum in the air suction pipe 58 so as thereby to release the reflection mirror 16 from the mirror support 46. Thereafter, the frame 18 with all optical systems including the first lens group 15, the reflection mirror 16 and the second lens group 17 correctly installed therein is detached from the support arm 43 of the mirror fixing equipment 40.

Figure 8:
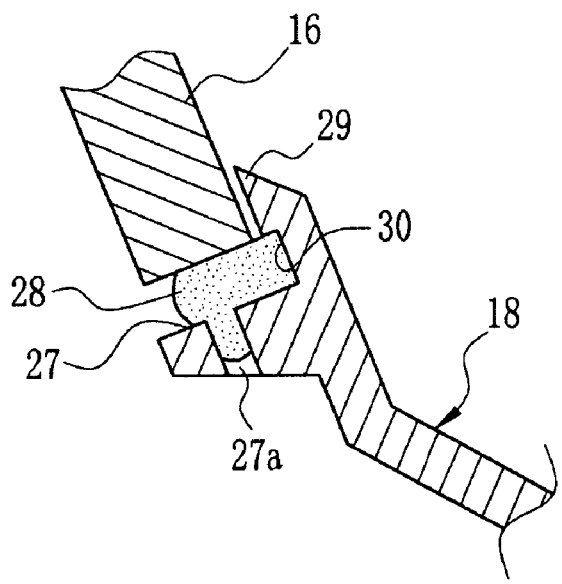
FIG. 8 is a sectional view of a mirror fixing structure according to another embodiment of the present invention.

As shown in FIG. 8, the frame 18 may have a lateral bore 27a opening into the mirror mounting aperture 27 for filling a space between the side wall of the mirror mounting aperture 27 and the reflection mirror 16 with the bonding adhesive 28 therethrough.

As just described above, since the reflection mirror 16 is fixedly mounted in the mirror mounting aperture 27 with the periphery out of direct contact with the aperture wall, the reflection mirror 16 is less subject to the degree of work accuracy of the mirror mounting aperture 27 of the frame 18. As a result the projection lens unit having a high optical performance is produced by less man power and at lower production costs. Further, the use of a bonding adhesive containing a particulate filler or a powdered filler prevents the reflection minor 16 from occurring positional displacement during curing of the bonding adhesive. The use of an ultraviolet cure bonding adhesive makes fixation of the reflection mirror 16 to the frame 18 hastened. In addition, the use of a pneumatic suction socket for holding the reflection mirror 16 from the back makes it quite easy to fill the circumferential clearance left between the reflection mirror 16 and the mirror mounting aperture 27 with a bonding adhesive.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A projection lens unit for use in a rear projection device having a screen onto which a projection lens system projects a subject image from behind, said projection lens unit comprising:

a first lens group disposed at an incident side of said projection lens system;

a second lens group disposed optically coaxially with said first lens group at an exit side of said projection lens system;

a reflection mirror disposed between said first and said second lens groups for folding an optical axis of said projection lens system; and a frame for fixedly holding said first lens group, said second lens group and said reflection mirror, said frame having a mounting aperture which is greater in outside dimension than said reflection mirror so as to receive said reflection mirror therein with a circumferential clearance left between said reflection mirror and said mounting aperture which is filled with a bonding adhesive from the outside of said frame so as thereby to fix said reflection mirror to said frame.

2. The projection lens unit as defined in claim 1, wherein said bonding adhesive contains either one of a particulate filler and a powdered filler.

3. The projection lens unit as defined in claim 1, wherein said mounting aperture has an inside dimension large enough to allow position adjustment of said reflection mirror therein.

4. A method of fixing a reflection mirror to a frame of a projection lens unit for use in a rear projection device having a screen onto which a projection lens system projects a subject image from behind, said frame fixedly holding said projection lens system which comprises a first lens group disposed at an incident side thereof, a second lens group disposed optically coaxially with said first lens group at an exit side thereof and said reflection mirror disposed between said first and said second lens groups for folding an optical axis of said projection lens system and having a mounting aperture in which said reflection mirror is mounted, said mirror fixing method comprising the steps of:

fixedly holding said first and said second lens group in said frame;

holding and placing said reflection mirror within said mounting aperture of said frame;

projecting a test pattern onto a screen remote from said projection lens unit through said projection lens unit with said reflection mirror placed within said mounting aperture of said frame;

adjusting said reflection mirror in position in said mounting aperture of said frame according to an optical image of said test pattern projected on said screen; and bonding and fixing said reflection mirror to said frame with a bonding adhesive after completion of position adjustment of said reflection mirror.

5. The mirror fixing method as defined in claim 4, wherein said mounting aperture is greater in outer size thin said reflection mirror to provide a circumferential clearance between an inner periphery of said mounting aperture and an outer periphery of said reflection mirror placed within said mounting aperture which is large enough to be filled with said bonding adhesive from the outside of said frame.

6. The mirror fixing method as defined in claim 4, wherein said bonding adhesive contains either one of a particulate filler and a powdered filler.

7. The mirror fixing method as defined in claim 4, wherein said bonding adhesive comprise an ultraviolet cure bonding adhesive.

8. A mirror fixing equipment for fixing a reflection mirror to a frame of a projection lens unit for use in a rear projection device having a screen onto which a projection lens system projects a subject image from behind, said frame fixedly holding said projection lens system which comprises a first lens group disposed at an incident side thereof, a second lens group disposed optically coaxially with said first lens group at an exit side thereof and said reflection mirror disposed between said first and said second lens groups for folding an optical axis of said projection lens system and having a mounting aperture in which said reflection mirror is mounted and fixed with a bonding adhesive, said mirror fixing equipment comprising:

support means for supporting said frame with said first and said second lens group fixed thereto;

mirror holding for holding and placing said reflection mirror within said mounting aperture of said frame from the outside of said frame keeping a circumferential clearance between an outer periphery of said reflection mirror and an inner periphery of said mounting aperture;

image forming means for forming a test pattern image;

a screen onto which said test pattern image is projected by said projection lens system with said reflection mirror held in said mounting aperture of said frame by said mirror holding means;

position adjusting means for adjusting a position of said reflection mirror held within said mounting aperture of said frame according to said test pattern image projected onto said screen; and fixing means for fixing said reflection mirror to said frame with a bonding adhesive.

9. The mirror fixing equipment as defined in claim 8, wherein said mounting aperture is greater in outside dimension than said reflection mirror so as to provide a circumferential clearance between an inner periphery of said mounting aperture and an outer periphery of said reflection mirror placed within said mounting aperture for which is large enough to allow position adjustment of said reflection mirror in said mounting aperture and to be filled with said bonding adhesive from the outside of said frame.

10. The mirror fixing equipment as defined in claim 9, wherein said fixing means comprising adhesive filling means for filling said circumferential clearance with said bonding adhesive and curing means for curing said bonding adhesive in said circumferential clearance.

11. The mirror fixing equipment as defined in claim 10, wherein said bonding adhesive comprise an ultraviolet cure bonding adhesive and said curing means comprises an ultraviolet lamp.

12. The mirror fixing equipment as defined in claim 10, wherein said mirror holding means comprises an pneumatic suction device for holding fast said reflection mirror from the back.

* * * * *